L. E. BAKER.
SELF MEASURING LIQUID DISPENSING APPARATUS.
APPLICATION FILED OCT. 27, 1919.
1,395,696.
Patented Nov. 1, 1921.
4 SHEETS—SHEET 4.
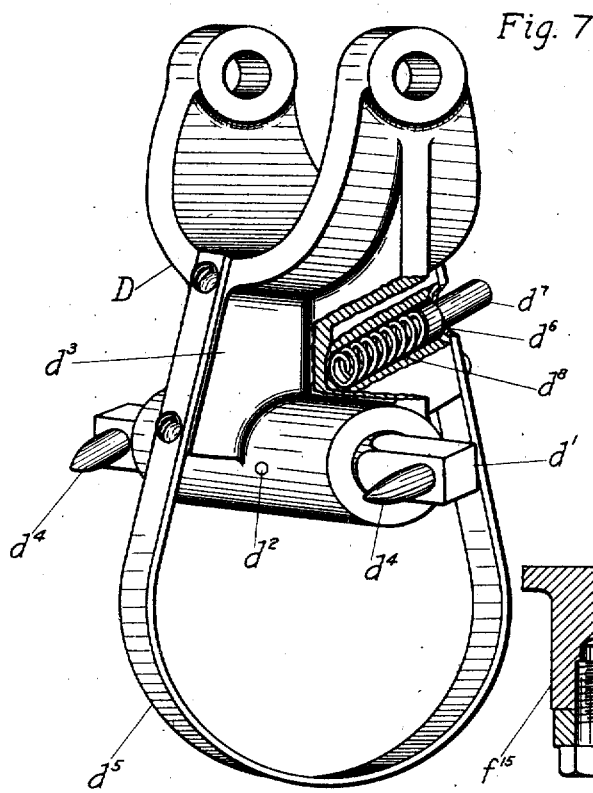
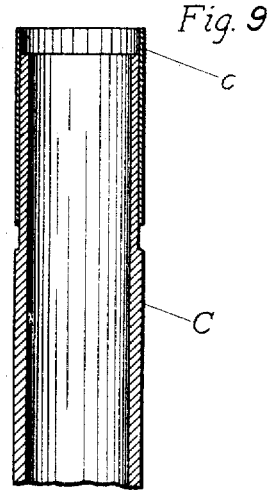
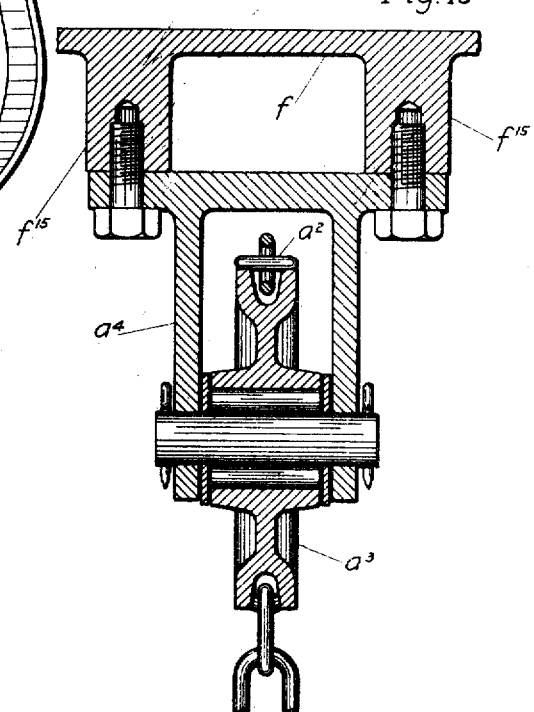
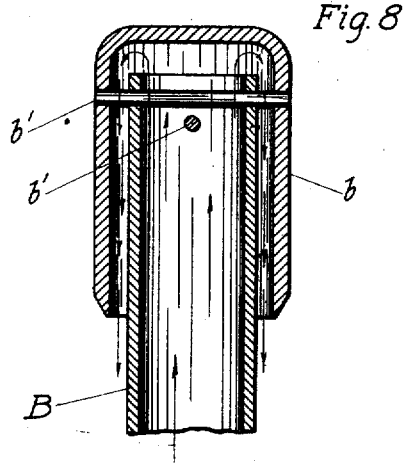
INVENTOR.
Linnaeus E. Baker
BY
Walter U. Knight
ATTORNEY.

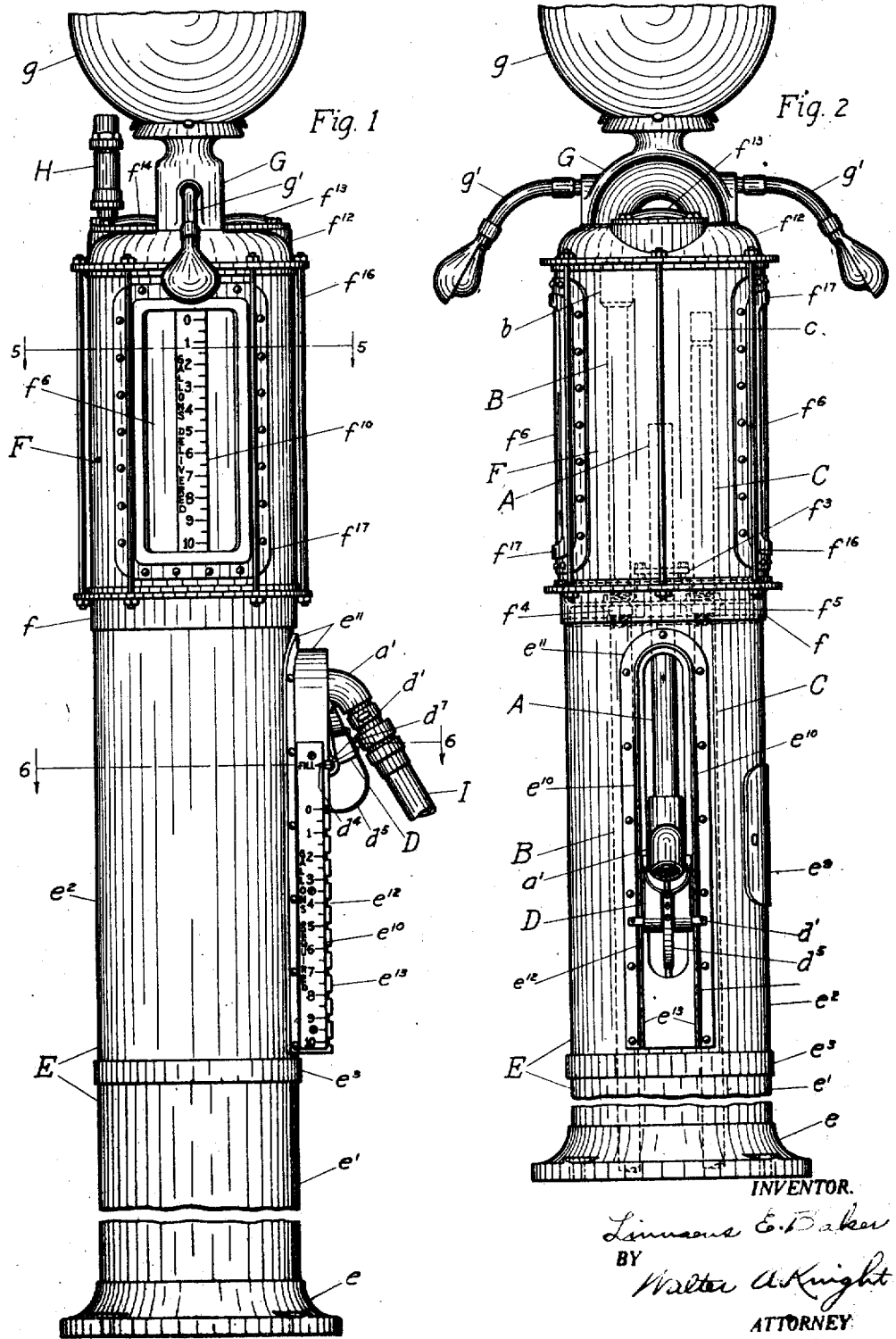

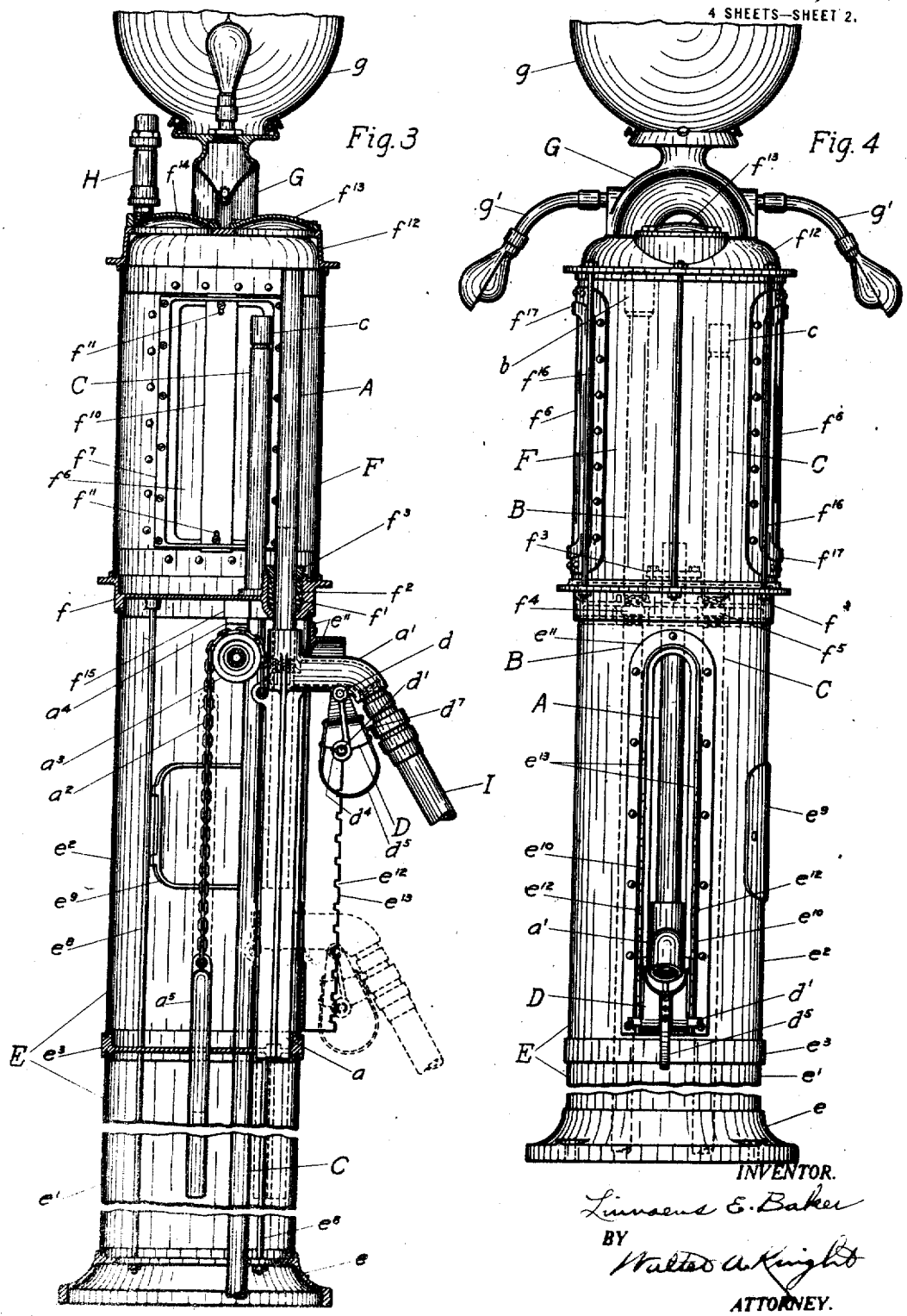

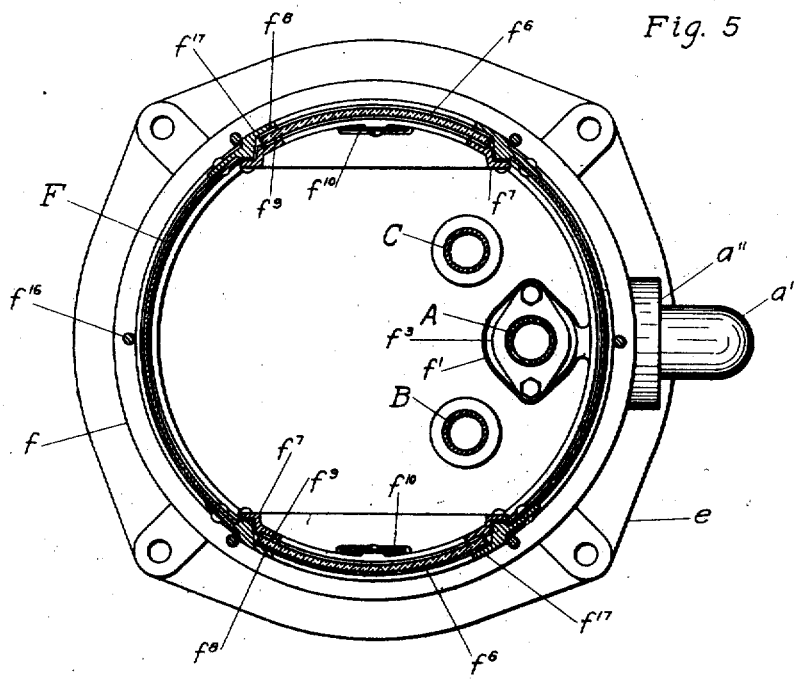
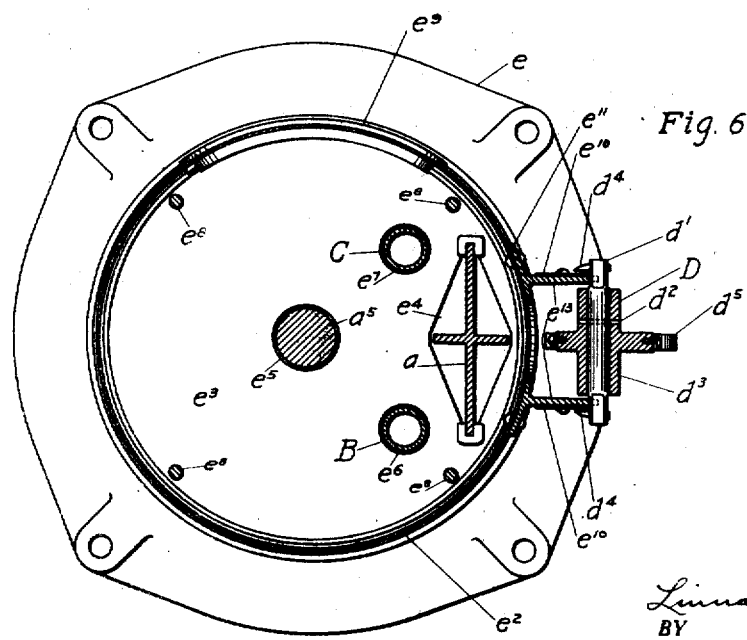

UNITED STATES PATENT OFFICE.

LINNAEUS E. BAKER, OF FORT WAYNE, INDIANA, ASSIGNOR TO WAYNE OIL TANK AND PUMP COMPANY, OF FORT WAYNE, INDIANA, A CORPORATION OF INDIANA.

SELF-MEASURING LIQUID-DISPENSING APPARATUS.

1,395,696.   Specification of Letters Patent.   Patented Nov. 1, 1921.

Application filed October 27, 1919. Serial No. 333,596.

*To all whom it may concern:*

Be it known that I, LINNAEUS E. BAKER, a citizen of the United States, residing at Fort Wayne, in the county of Allen and State of Indiana, have invented new and useful Improvements in Self-Measuring Liquid-Dispensing Apparatus, of which the following is a specification.

My improvement relates to self-measuring liquid dispensing apparatus of the type having an elevated container from which the liquid dispensed flows by gravity. Such apparatus is most commonly set up on the sidewalk or along a driveway for dispensing gasolene direct to the tanks of automobiles.

The object of my invention is to provide a vertically adjustable discharge pipe terminating at the bottom in a discharge nozzle or hose; said discharge pipe extending from below up into said container through a stuffing box. The apparatus is so constructed as to insure accurate measurement under all conditions, and there are gages to determine the quantity of liquid delivered and to be delivered.

Additional advantages of my invention are a simple and easily operated apparatus adapted to rapidly deliver the quantity of liquid desired direct to an auto tank or other vessel.

The apparatus also permits starting to deliver liquid on an order with enough liquid in the container to meet the maximum demand for that sale and the operator may begin delivery by lowering the discharge pipe gradually or from time to time and so continue until the purchaser is satisfied. The quantity of liquid delivered may be accurately learned from the container gage, whether the setting latch finally rests in a notch of the lower gage or not.

The particular embodiment of my invention selected for illustration is a so-called visible liquid measuring and dispensing apparatus, (with source of supply and means for raising liquid from said source to the container not shown) in which :—

Figure 1, is an elevation of the apparatus from such a position as to show both one of the scales indicating quantity of liquid the apparatus is set to discharge and one of the scales indicating the quantity of liquid actually discharged from the container.

Fig. 2, is an elevation of the apparatus taken at 90° to Fig. 1 with the discharge pipe in mid position and operating interior parts shown in dotted lines. (The discharge hose is omitted.)

Fig. 3, is a vertical axial section, through the apparatus in the same position shown in Fig. 1, showing an axial section through the stuffing box and exposing the vertically adjustable discharge pipe in extreme raised position and its attendant parts in their relative positions. (The adjustable discharge pipe is also shown by dotted lines in a lowered position with the attendant parts in their relative positions.)

Fig. 4, is the same as Fig. 2 with the discharge pipe in extreme lowered position.

Fig. 5, is a cross section on the line 5—5 of Fig. 1.

Fig. 6, is a cross section on the line 6—6 of Fig. 1. (The discharge hose is omitted.)

Fig. 7, a detail, is an enlarged perspective of the setting latch with parts broken away and in section to expose the plunger and spring that holds the setting latch against the notched scale.

Fig. 8, a detail, is an enlarged axial section of the deflector and upper end of the fill pipe, showing the direction taken by the liquid delivered into the container therethrough.

Fig. 9, a detail, is an enlarged axial section of the upper end of the overflow pipe, and Fig. 10, a detail, is an enlarged vertical section through the counterweight pulley and attendant part of the bottom head of the container.

Referring now to the drawings, E is a pedestal of such height as to raise the container cylinder F, and other parts the desired distance. The bottom $e$, of the pedestal is adapted to be bolted to the foundation on which the apparatus sets. The pedestal shell is made of two parts—$e^1$ and $e^2$, each seated in a groove in the peripheral flange of a round plate $e^3$, and $e^1$, seats in a similar groove in the bottom $e$. The plate $e^3$, has openings $e^4$, $e^5$, $e^6$, $e^7$, the purpose of which will hereinafter be described and openings for the tie rods $e^8$, which securely hold together the several parts of the pedestal, and also hold the pedestal itself to the bottom head $f$, of the liquid container cylinder F. The pedestal may be provided with one or more doors $e^9$, to afford convenient access to the interior. A scale $e^{10}$, shown graduated to gallons and half gallons, is fixed to or made a part of the flange $e^{13}$, on either side of the slotted plate $e^{11}$. Notches $e^{12}$, graduated to gallons are provided in the edges of the flange $e^{13}$.

The bottom head $f$, of the container is a round plate with a peripheral flange which has a groove below to receive the shell $e^2$, of the pedestal and a groove above to receive the container cylinder F. This bottom head $f$, has a stuffing box $f^1$, with a suitable packing $f^2$, and gland $f^3$, through which passes the discharge pipe A, hereinafter to be described. The bottom head $f$, also has an opening $f^4$, threaded to receive the upper and lower parts of the fill pipe B, hereinafter to be described and an opening $f^5$, threaded to receive the upper and lower parts of the overflow pipe C, hereinafter to be described. On the under side of the bottom head $f$, are cast two projecting lugs $f^{15}$, adapted to sustain the counter weight pulley $a^3$, hereinafter to be described.

The container cylinder F, as shown in the drawings is made of sheet metal with a suitable number of windows $f^6$, of transparent material so placed that the customer can see the height of liquid in the container from his automobile next the curb from either side and from other points as desired. These windows are clamped in position by removable oblong ring plates $f^7$, screws and frames $f^{17}$, with gaskets $f^8$, $f^9$, to form a leak-tight joint. To each oblong ring plate $f^7$, is attached a scale $f^{10}$, for the liquid container. This scale, here shown graduated to gallons and half gallons, is provided with a slot $f^{11}$, at each end, through which the screws pass that secure the scale to the ring plate and the slots are provided to permit exact adjustment of each scale to the container cylinder.

The top head $f^{12}$, has a groove in the under side of its peripheral flange to receive the container cylinder F. Hand hole plates $f^{13}$, $f^{14}$, are provided on the head $f^{12}$, to make the interior accessible for cleaning, adjustment and repairs. A vent valve H, of any usual construction is placed on top of the top head $f^{12}$, at any convenient place and as shown in the drawings is on the hand hole plate $f^{14}$.

The top head $f^{12}$, is surmounted by a lamp support G, adapted to have the usual top globe $g$, and with brackets $g^1$, to support side lamps to illuminate the scales.

Tie rods $f^{16}$, connect the top head $f^{12}$, and the bottom head $f$, and hold the container cylinder F, securely in place. It will be understood that joints are made leak tight with litharge or any other suitable way.

The fill pipe B, passing through the hole $e^6$, of the plate $e^3$, and being connected below to the source of liquid supply (not shown) conveys the liquid through the bottom head $f$, of the container and terminates inside near the top of the container. This upper end is provided with a deflector $b$, consisting of an inverted cup or thimble firmly held in position free from contact with the pipe B, by pins $b^1$. This deflector causes the liquid to flow down the outside of the fill pipe B, causing the least possible agitation of the body of the liquid in the container cylinder F. The bottom edge of the deflector $b$ must be above the desired zero level of the liquid in the container cylinder F, so that it cannot siphon the liquid below said level back to the source of liquid supply.

The overflow pipe C, extends from the inside upper portion of the liquid container cylinder F, down through the bottom head $f$, of the container and the hole $e^7$, of the plate $e^3$, to the source of liquid supply (not shown.) At its upper end this pipe C, terminates with a sleeve $c$, adjustable vertically so that the upper edge of said sleeve may be permanently set at the desired zero level of the liquid container cylinder F.

The discharge pipe A, is vertically movable in the liquid container through the stuffing box $f^1$, packing $f^2$, and gland $f^3$, and is kept in exact alinement by the guiding extension $a$, passing through the opening $e^4$, of the plate $e^3$. The guiding extension $a$, is integral with and extends downwardly from the bottom of an L $a^1$, into which L fits the lower end of the discharge pipe A. The horizontal portion of the L $a^1$, extends outwardly through the slot and between the flanges $e^{13}$, of the plate $e^{11}$, and the hose I, is attached thereto.

To any convenient part of the discharge pipe A, or its attendant parts, is secured one end of a cable or chain $a^2$, which passes over a pulley $a^3$, whose bracket $a^4$, is secured to the projecting lugs $f^{15}$, on the bottom head $f$, of the container. The other end of this chain $a^2$, is attached to a counter weight $a^5$ of suitable weight to counterbalance the weight of the discharge pipe A, L $a^1$, and guiding extension $a$, so as to insure easy movement up and down of the discharge pipe.

A setting latch D, is secured to the under side of the L $a^1$, by a pivot $d$, in such a manner as to oscillate at right angles to the plane passing through the axes of both branches of the L $a^1$. A latch bar $d^1$, is fixed by the pin $d^2$, or in any other suitable manner to the latch block $d^3$, in such a position that the latch bar will enter any of the notches $e^{12}$, when the latch D, is in engaging position. Pointers $d^4$, fixed to the latch bar $d^1$, near the ends thereof indicate on the scales $e^1$, the quantity of liquid required to be dispensed by the apparatus when the latch has been set in accordance with the order. A handle $d^5$, is secured to the latch block $d^3$, for convenience in manipulating the setting latch. The handle $d^5$, is drilled at $d^6$, to permit the shank of the plunger $d^7$, to protrude through its upper side; and the latch block $d^3$, is drilled to form a receptacle for the head of this plunger, and also to receive a spring $d^5$. This spring tends to keep the plunger in extreme protruded position and when the hose I, is in position for use its coupling keeps the plunger sufficiently depressed to cause it to hold the setting latch D, securely against the notched scale whether in position for the latch bar $d^4$, to enter one of the notches $e^{12}$, or not.

Final adjustments for and operation of my apparatus is as follows:—

Upon assembling the device and before it is ready for accurate measurement of liquid to be dispensed therefrom, it is necessary to vertically adjust the discharge scale $f^{10}$, of the container cylinder F, so that its zero indication will be level with the upper end of the discharge pipe A, when the setting latch D, is in the zero notch of the discharge scale $e^{10}$. This adjustment is made by loosening the screws which hold said scale $f^{10}$ to the ring plate $f^1$, and with the liquid filled to the level of the top edge of the discharge pipe A. Access to the interior parts of the container cylinder F, is by means of hand hole plates $f^{13}$, and $f^{14}$. The terminal sleeve c, at the upper end of the overflow pipe C, is then adjusted vertically so that its upper edge is also level with the surface of the liquid.

By suitable means, the scale $f^{10}$, of the container cylinder F, and the scale $e^{10}$, of the slotted plate $e^{11}$, with its corresponding notches $e^{12}$, have been properly graduated so that the indications thereon will show the correct amounts discharged from the container cylinder F, at any particular setting.

The device is now ready for operation. The setting latch D, is raised to the "fill" position (see Fig. 1) as indicated on the scale $e^{10}$, in which position the top end of the discharge pipe A, is above the surface of the liquid while filling. The liquid to be dispensed is then caused by suitable means (not shown) to flow from the source of liquid supply (not shown) through the fill pipe B, into the container cylinder F, until the level of the liquid is raised to a level above that of the top of the overflow pipe C. Through the overflow pipe C, the excess liquid gravitates to the source of supply, quickly and accurately bringing the level of the liquid in the container cylinder F, to zero on the scale $f^{10}$. The setting latch D, is then lowered to the amount called for as observed on the scale $e^{10}$, the upper end of the discharge pipe A, being lowered a corresponding amount by the sliding of said pipe through the stuffing box, $f^1$, $f^2$, $f^3$, in the bottom head $f$, of the container. The liquid will then flow by gravity through the discharge pipe A, and the hose I, to the auto tank or other vessel until the upper end of said pipe establishes the final liquid level and indicates on the scale $f^{10}$, in the container, the exact amount discharged.

In case the customer cannot make up his mind in advance how much liquid is necessary, the operator may immediately begin delivery by either gradually or periodically lowering the setting latch and discharge pipe and continue so to do until decision is finally made or until the auto tank or vessel is filled.

Repeated raising of the latch D slidable discharge pipe A, and attendant parts for refilling the container cylinder F, and partial or complete lowering of the same to draw liquid is all that is necessary to operate my invention. The counterweight makes such operation easy. In ordinary practice as soon as the required quantity has been drawn the operator will raise the latch to "fill" position so as to make ready for the next sale and such raising facilities complete draining of the hose.

Having thus described my invention what I claim as new and desire to secure by Letters Patent is:

1. A liquid dispensing apparatus adapted to dispense liquid by gravity, having in combination an elevated liquid container, an overflow pipe terminating at its upper end within said container at a predetermined level and at its lower end in a source of liquid supply, a fill pipe terminating at its upper end within said container at a level above that of the overflow pipe and at its lower end in the source of liquid supply, a discharge pipe terminating at its upper end within the container and at is lower end in an exteriorly discharging outlet fixed to and movable with said discharge pipe, said discharge pipe being manually adjustable as to height.

2. In combination with a liquid dispensing apparatus having an elevated liquid container whence the liquid may be discharged by gravity, a discharge pipe slidable up and down through a stuffing box in the bottom head of said container, an outlet fixed to the bottom end of said discharge pipe for delivering the liquid exteriorly of the apparatus, and an extension fixed to said discharge pipe to guide the same.

In testimony whereof I have hereunto set my hand in presence of two subscribing witnesses.

LINNAEUS E. BAKER.

Witnesses:
Z. WERNHOFF,
FRED C. JENNE.